United States Patent
Österlund et al.

(10) Patent No.: US 12,004,246 B2
(45) Date of Patent: Jun. 4, 2024

(54) METHOD AND WIRELESS DEVICE FOR HANDLING COMMUNICATIONS USING DUAL SIMS

(71) Applicant: Telefonaktiebolaget LM Ericsson (publ), Stockholm (SE)

(72) Inventors: Håkan Österlund, Ekerö (SE); Henrik Johansson, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 463 days.

(21) Appl. No.: 17/415,750

(22) PCT Filed: Dec. 18, 2018

(86) PCT No.: PCT/SE2018/051339
§ 371 (c)(1),
(2) Date: Jun. 18, 2021

(87) PCT Pub. No.: WO2020/130893
PCT Pub. Date: Jun. 25, 2020

(65) Prior Publication Data
US 2022/0086933 A1    Mar. 17, 2022

(51) Int. Cl.
*H04W 76/15* (2018.01)
*H04W 8/18* (2009.01)
(Continued)

(52) U.S. Cl.
CPC .......... *H04W 76/15* (2018.02); *H04W 8/183* (2013.01); *H04W 68/005* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 2013/0303203 A1 | 11/2013 | Wang et al. | |
| 2016/0095157 A1 | 3/2016 | Wenzel et al. | |
| 2017/0118255 A1* | 4/2017 | Tsai | H04L 63/0272 |

FOREIGN PATENT DOCUMENTS

| | | |
|---|---|---|
| CN | 104160759 A | 11/2014 |
| CN | 106375588 A | 2/2017 |

(Continued)

OTHER PUBLICATIONS

International Search Report and Written Opinion for Application No. PCT/SE2018/051339, dated Jun. 14, 2019, 11 pages.
(Continued)

*Primary Examiner* — Alex Skripnikov
(74) *Attorney, Agent, or Firm* — Nicholson De Vos Webster & Elliott LLP (57) ABSTRACT

A method and a wireless device having a first Subscriber Identity Module (SIM) of a first subscription and a second SIM of a second subscription, for handling communications. The device establishes an internet connection with the second subscription when the first SIM and the first subscription are active in an ongoing communication. A notification is then received by the device over said internet connection indicating that an incoming communication directed to the second SIM has been received by the second subscription. Thereby, a user of the device is made aware of the incoming communication without requiring a forwarding function from the second subscription to the first subscription.

26 Claims, 6 Drawing Sheets

(51) Int. Cl.
*H04W 68/00* (2009.01)
*H04W 88/06* (2009.01)

(56) References Cited

FOREIGN PATENT DOCUMENTS

| | | |
|---|---|---|
| CN | 106537951 A | 3/2017 |
| WO | 2018078503 A1 | 5/2018 |

OTHER PUBLICATIONS

International Preliminary Report on Patentability, PCT App. No. PCT/SE2018/051339, dated Jul. 1, 2021, 9 pages.
Office Action, CN App. No. 201880100699.5, dated Feb. 7, 2022, 7 pages of Original Document Only.
Communication pursuant to Article 94(3) EPC, EP App. No. 18830544.5, dated Apr. 24, 2023, 4 pages.
Communication pursuant to Article 94(3) EPC, EP App. No. 18830544.5, dated May 19, 2022, 6 pages.
Communication pursuant to Article 94(3) EPC, EP App. No. 18830544.5, dated Oct. 19, 2022, 5 pages.
Communication under Rule 71(3) EPC, EP App. No. 18830544.5, dated Oct. 18, 2023, 7 pages.
Decision to grant, EP App. No. 18830544.5, dated Jan. 5, 2024, 2 pages.
Notification to Grant, CN App. No. 201880100699.5, dated Jul. 8, 2022, 4 pages.
Office Action, CA App. No. 3,123,800, dated May 23, 2023, 4 pages.
Office Action, CA App. No. 3, 123,800, dated Sep. 22, 2022, 3 pages.

\* cited by examiner

METHOD AND WIRELESS DEVICE FOR HANDLING COMMUNICATIONS USING DUAL SIMS

CROSS-REFERENCE TO RELATED APPLICATIONS

This application is a National stage of International Application No. PCT/SE2018/051339, filed Dec. 18, 2018, which is hereby incorporated by reference.

TECHNICAL FIELD

The present disclosure relates generally to a method and a wireless device having a first Subscriber Identity Module, SIM, associated with a first subscription and a second SIM associated with a second subscription, for handling communications using the first and second SIMs.

BACKGROUND

In the field of wireless devices, Subscriber Identity Module, SIM, cards are well-known which may have the form of a removable card that can be installed in a wireless device so that the device is personalized according to settings on the card. Electronic SIMs without a physical card, known as eSIMs, are also available which can be obtained over a wireless network. Further, there are also wireless devices that can use two SIMs associated with different subscriptions. When having two SIMs, this type of device may be referred to as a Dual SIM Dual Standby, DSDS, device, or simply dual SIM device for short. Such wireless devices have the advantage of providing communication services via separate subscriptions by means of a single device, and the subscriptions can be completely independent of each other, e.g. in terms of configurations, settings, tariffs, charging, and so forth.

Usually, it is the user that manually activates the SIM/subscription to use for communication by means of the dual SIM device. Another possibility is that the subscriptions could be time and/or location dependent, so that they are operable only at certain times of day and/or week, and/or when the device is located in certain geographical areas. For example, a user may have one subscription for use at work which is paid for by his/her employer, and another subscription for private use which is paid for by the user himself/herself. In another example, two users may be able to operate the same device at different times, where one subscription can be used by one user and another subscription can be used by the other user, e.g. by requiring that a login procedure is executed by the respective users.

Only one of the SIMs can be used at a time and the SIMs and associated subscriptions consequently include an active SIM/subscription which is currently used for a call and an inactive SIM/subscription which is currently not used. In this disclosure, it is said that the wireless device has a first SIM associated with a first subscription and a second SIM associated with a second subscription where either of the first and second SIMs/subscriptions can be active and the other SIM/subscription would then be inactive. In idle mode when no call is ongoing, either of the SIMs can receive a call.

However, it may be a problem that only one of the SIMs/subscriptions can be active at any time, which means that if an incoming communication from a calling party is directed to the inactive SIM/subscription while the other SIM/subscription is active, the communication will be ignored and the user will be unaware of the incoming communication. This can be avoided by setting a forwarding function in the inactive SIM/subscription so that communications directed to the inactive SIM/subscription will be forwarded to the active SIM/subscription, which will however entail additional forwarding costs and load on the network(s) involved and may also require manual setting of the forwarding function.

SUMMARY

It is an object of embodiments described herein to address at least some of the problems and issues outlined above. It is possible to achieve this object and others by using a method and a wireless device as defined in the attached independent claims.

According to one aspect, a method is performed by a wireless device having a first Subscriber Identity Module, SIM, associated with a first subscription and a second SIM associated with a second subscription, for handling communications using the first and second SIMs. In this method, the wireless device establishes an internet connection with the second subscription when the first SIM and the first subscription are active in an ongoing communication. The wireless device then receives a notification over said internet connection indicating that an incoming communication directed to the second SIM has been received by the second subscription.

According to another aspect, a wireless device having a first Subscriber Identity Module, SIM, associated with a first subscription and a second SIM associated with a second subscription, is arranged to handle communications using the first and second SIMs. The wireless device is configured to establish an internet connection with the second subscription when the first SIM and the first subscription are active in an ongoing communication. The wireless device is also configured to receive a notification over said internet connection indicating that an incoming communication directed to the second SIM has been received by the second subscription.

When using either of the above method and wireless device, it is an advantage that the user of the wireless device can be made aware of any incoming communication without requiring a forwarding function from the second subscription to the first subscription. This also brings the advantage of reduced resource consumption in the network(s) used by omitting the forwarding function.

The above method and wireless device may be configured and implemented according to different optional embodiments to accomplish further features and benefits, to be described below.

A computer program is also provided comprising instructions which, when executed on at least one processor in the above wireless device, cause the at least one processor to carry out the method described above. A carrier is also provided which contains the above computer program, wherein the carrier is one of an electronic signal, an optical signal, a radio signal, or a computer readable storage medium.

BRIEF DESCRIPTION OF DRAWINGS

The solution will now be described in more detail by means of exemplary embodiments and with reference to the accompanying drawings, in which.

DETAILED DESCRIPTION

The embodiments and examples described herein are related to a wireless device which has a first SIM, denoted SIM1, associated with a first subscription and a second SIM, denoted SIM2, associated with a second subscription. It is generally assumed that the first SIM and the first subscription, "first SIM/subscription" for short, are active in an ongoing communication while the second SIM and the second subscription, "second SIM/subscription" for short, are inactive and not used as long as the first SIM/subscription is active. In this field, inactive SIM/subscription is sometimes referred to as "standby" SIM/subscription, while the term inactive will be used herein for consistency.

Figure 1A:
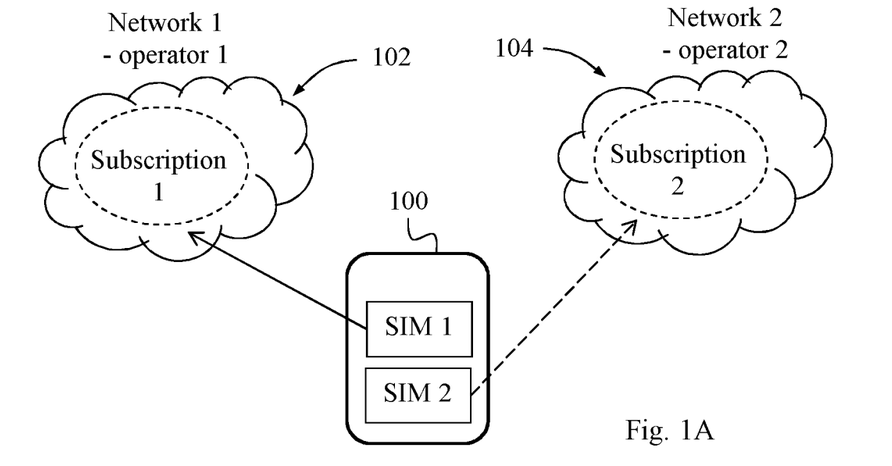
FIG. 1A is a schematic illustration of a wireless device having SIMs associated to subscriptions in different networks.

The first and second subscriptions described herein may be registered in two respective wireless networks controlled by two different operators or in the same wireless network controlled by a single operator. FIG. 1A illustrates an example of how two SIMs can be employed in a wireless device 100 where the first SIM is associated with a first subscription which is registered in one wireless network 1 controlled by operator 1, while the second SIM is associated with a second subscription registered in another wireless network 2 controlled by operator 2. The currently active SIM/subscription 1 is indicated by a full arrow and the inactive SIM/subscription 2 is indicated by a dashed arrow. The networks 1 and 2 may be overlapping or at least partly separated geographically.

Figure 1B:
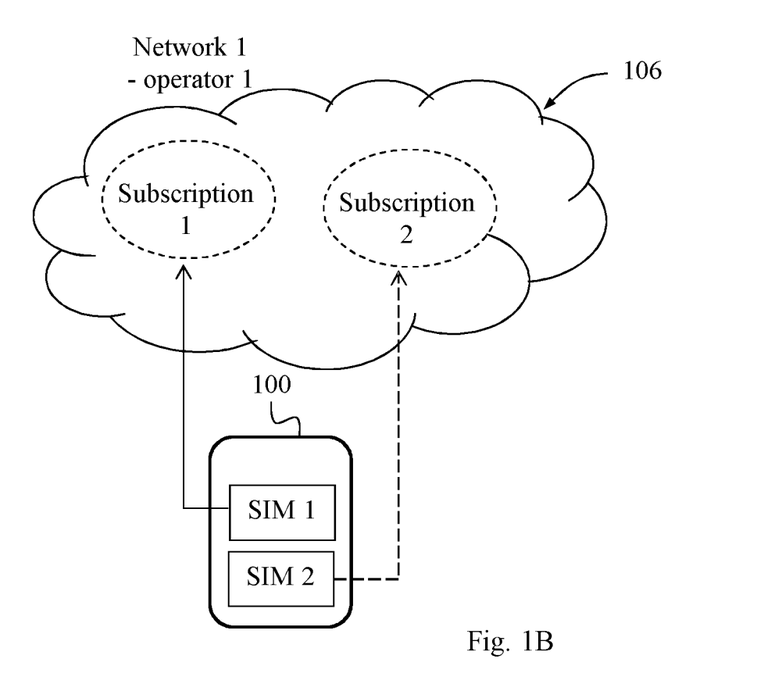
FIG. 1B is another schematic illustration of a wireless device having SIMs associated to different subscriptions in the same network.

FIG. 1B illustrates another example where the first SIM in the wireless device 100 is associated with a first subscription in a wireless network 1 controlled by operator 1, while the second SIM is associated with a second subscription in the same wireless network 1. As in FIG. 1A, the currently active SIM/subscription 1 is indicated by a full arrow and the inactive SIM/subscription 2 is indicated by a dashed arrow. The embodiments and examples described herein are applicable in either case of FIGS. 1A and 1B.

Briefly described, a solution is provided herein to avoid the need for forwarding an incoming communication on the inactive second subscription to the active first subscription when the wireless device is engaged in a communication via the first subscription, and still alert the user of the wireless device about the incoming communication. This can be achieved if the wireless device establishes an internet connection to the second subscription so that a notification indicating an incoming communication on the inactive second subscription, can be received on the active first SIM/subscription over the internet connection. In some examples, apart from generally indicating an incoming communication the notification may also indicate the caller's identity or number, the type of incoming communication, and any other information of interest about the communication.

Thereby, the user is able to notice and observe the notification and can decide how to act on the incoming communication, e.g. by accepting or rejecting it, without needing any conventional forwarding of the communication which would trigger a normal Call Waiting procedure from the second subscription to the first subscription. If accepted, the first SIM/subscription will be inactivated and the second SIM/subscription will be activated instead to receive the incoming communication.

In the terminology used in this description, "ongoing communication" indicates that the device is actively engaged in a communication via the currently active SIM/subscription, which communication may be a voice or video call. On the other hand, "incoming communication" indicates that a communication has been received by the currently inactive subscription, which communication may be a voice or video call or a message such as an SMS or other messaging type.

Figure 2:
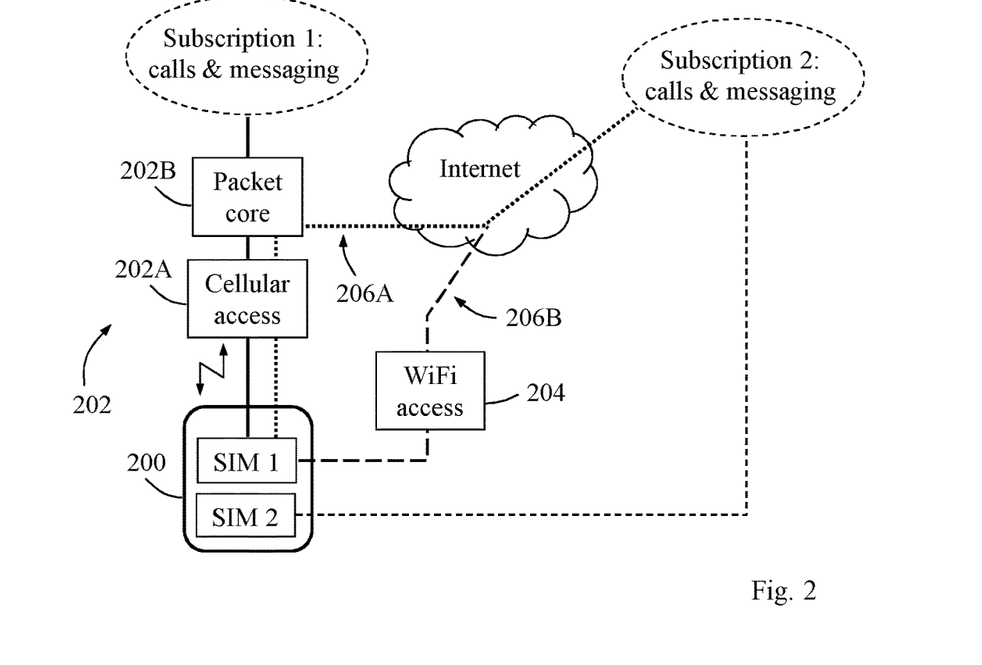
FIG. 2 is a communication scenario illustrating an example of how the solution may be employed, according to some example embodiments.

The solution will now be described and explained in terms of functionality in a wireless device which is operable to use a first SIM, i.e. SIM1, for communications via a first subscription and a second SIM, i.e. SIM2, for communications via a second subscription. FIG. 2 illustrates an example of a communication scenario where a wireless device 200 with dual SIMs is currently using SIM1 in an ongoing communication over a wireless network 202 which comprises a cellular access part 202A and a packet core part 202B, as schematically illustrated. The packet core part 202B can provide various applications and communication services including calls and messaging, and SIM1 is associated with a subscription 1 in the wireless network 202, as indicated in the figure. SIM2 is associated with another subscription 2 which may be registered in the same network 202 or in another network, not shown. The second subscription can likewise provide various applications and communication services including calls and messaging, as schematically indicated in the figure. When the communication is established via the first SIM/subscription, the wireless device 200 also establishes an internet connection 206A using the active first SIM/subscription or 206B using WiFi access to the second subscription. The internet connection may be established over the access connection used in the ongoing communication, as indicated by a dotted line 206A from SIM1 over internet, in this case a cellular connection over the wireless network 202. Alternatively, the internet connection may be established over an access connection not used in the ongoing communication, e.g. over a WiFi connection 204, as indicated by a dashed line 206B from SIM1 over internet.

Although the access connection used in the ongoing communication and the access connection not used in the ongoing communication are in this example illustrated as a cellular connection and a WiFi connection, respectively, the solution is not limited thereto. For example, the access connection used in the ongoing communication may just as well be a WiFi connection and the access connection not used in the ongoing communication may just as well be a cellular connection.

In either case, the internet connection 206A/206B can be used for communication between the wireless device 200 and the second subscription, even while the second SIM/subscription needs to be inactive because the first SIM/subscription is active. In this communication, a suitable protocol can be used, e.g. the Session Initiation protocol, SIP, or HTTP/Rest, which are both well-known in this field.

The communication over the internet connection 206A/206B includes a notification sent from the second subscription to SIM1 in the wireless device 200, said notification indicating that an incoming communication directed to the second SIM has been received by the inactive second subscription. The received notification, or a suitable representation thereof, is displayed or otherwise alerted on the wireless device 200 so that the user of device 200 can notice and read the notification. Thereby, the user of device 200 is made aware of the communication waiting in the second subscription and can decide how to act, e.g. either terminate the ongoing communication and initiate the incoming communication, or reject the incoming communication altogether or at least for the time being.

In response to some suitable input from the user, the wireless device 200 may send a response to the second subscription over the internet connection 206A/206B, to indicate whether the incoming communication is accepted or rejected. If accepted and the incoming communication is a call, the second subscription may initiate an announcement to the calling party to indicate that the call will soon be connected to the called user. Thereby, the caller is notified that there could be a delay before the called user answers and the caller can hold on accordingly. After terminating the ongoing communication on SIM1, the user of device 200 can activate SIM2 and receive the incoming call. If the incoming communication is instead a message such as an SMS, no response to the notification needs to be sent from the device 200 and once SIM2 is activated at any time after the ongoing communication is terminated on SIM1, the user can receive the SMS on SIM2. Still, the user of device 200 is effectively notified that a message is waiting on the currently inactive second subscription.

Figure 3:
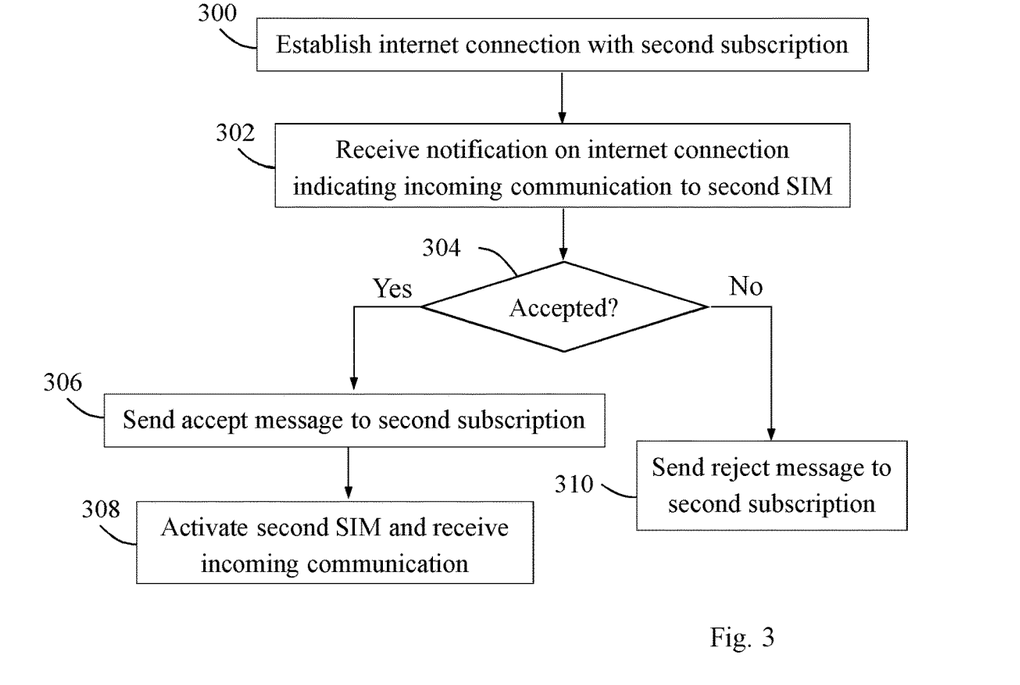
FIG. 3 is a flow chart illustrating a procedure in a wireless device, according to further example embodiments.

An example of how the solution may be employed in terms of actions performed by a wireless device such as the wireless device 200, is illustrated by the flow chart in FIG. 3 which will now be described with further reference to FIG. 2, although this procedure is not limited to the example of FIG. 2. The wireless device 200 has a first SIM associated with a first subscription and a second SIM associated with a second subscription. FIG. 3 thus illustrates a procedure in the wireless device 200 for handling communications using the first and second SIMs. Some optional example embodiments that could be used in this procedure will also be described.

A first action 300 illustrates that the wireless device 200 establishes an internet connection, such as 206A or 206B, with the second subscription when the first SIM and the first subscription are active in an ongoing communication. This may be done automatically as soon as the first SIM has been activated. Expressed generally, when one subscription becomes active, the wireless device 200 establishes an internet connection with the other inactive subscription.

In another action 302, the wireless device 200 further receives a notification over said internet connection indicating that an incoming communication directed to the second SIM has been received by the second subscription. The notification is presented to the user by the device 200 in a suitable manner, e.g. by displaying a text or a symbol, or by emitting a voice or other sound, or by any combination of the above alternatives. Thereby, the user is made aware that an incoming communication is waiting on the second subscription and can thus act in a suitable and desired manner, to be exemplified below.

The procedure involving actions 300 and 302 has the advantage that the user of device A can be made aware of any incoming communication without requiring a forwarding function from the second subscription to the first subscription. This also brings the advantage of reduced resource consumption in the network(s) used by omitting the forwarding function.

Some further examples of embodiments that may be employed in the above procedure in FIG. 3 will now be described. In one example embodiment, the wireless device 200 may further send a response message to the second subscription over said internet connection, the response message indicating whether the incoming communication is accepted or rejected.

The remaining actions in FIG. 3 can be seen as optional but may be useful when implementing actions 300 and 302. If the user has made some input responsive to the received notification, a next action 304 illustrates that the wireless device 200 determines whether the user accepts or rejects the incoming communication by said input.

If the incoming communication is accepted in action 304, an accept message is sent to the second subscription over the internet connection, in an action 306. In this case, another example embodiment may be that the ongoing communication is terminated via the first SIM and the incoming communication is received via the second SIM. Another action 308 illustrates that the wireless device 200 accordingly activates the second SIM and receives the incoming communication via the second SIM. Thereby, the activity status of the SIMs/subscriptions has been reversed so that when the second SIM/subscription becomes active the first SIM/subscription becomes the inactive one. As a result, the wireless device 200 may in this situation establish an internet connection with the first subscription instead when the second SIM/subscription are active in a communication so as to be notified of any incoming communication on the inactive first subscription, thus basically repeating the procedure in FIG. 3 by switching the roles between the first and second SIM/subscriptions.

On the other hand, if the incoming communication is not accepted but rejected in action 304, a reject message is sent to the second subscription over the internet connection, in an alternative action 310. As a result, the second subscription may initiate an announcement to a calling party to basically indicate that the called user is busy or not available to take the call.

In further example embodiments, the wireless device 200 may establish the internet connection via the first SIM over an access connection used in the ongoing communication, e.g. connection 206A shown in FIG. 2, or over an access connection not used in the ongoing communication, e.g. connection 206B shown in FIG. 2.

In further example embodiments, the wireless device may communicate over the internet connection using a Session Initiation Protocol, SIP, or a HTTP/rest protocol, or any other suitable internet enabled protocol. If SIP is used for the communication over the internet connection, another example embodiment may be that establishing the internet connection includes sending a SIP REGISTER message to the second subscription. In that case, another example embodiment may be that the SIP REGISTER message subscribes for communication events directed to the second SIM via the second subscription. Another alternative is to send a SIP SUBSCRIBE message.

In another example embodiment, the internet connection may comprise an Internet Control Channel, ICC. In another example embodiment, the notification received in action 302 may comprise a Call Waiting in Standby Subscription, CWSS, message. In another example embodiment, establishing the internet connection may be triggered when the ongoing communication is established, which has also been mentioned and described above.

Some different use case scenarios where the solution is employed will now be described with reference to the signaling diagrams in FIGS. 4-7. In these examples, a wireless device "A" corresponds to the wireless device 200 described above having SIM1 and SIM2 associated with a $1^{st}$ subscription and a $2^{nd}$ subscription, respectively. Further, "caller B" in the figures represents some communication equipment which tries to communicate with the wireless device A via the second subscription in the manner described below. What type of equipment is used at caller B is however of no particular significance to the solution, as long as it is capable of operating in the manner described below.

Figure 4:
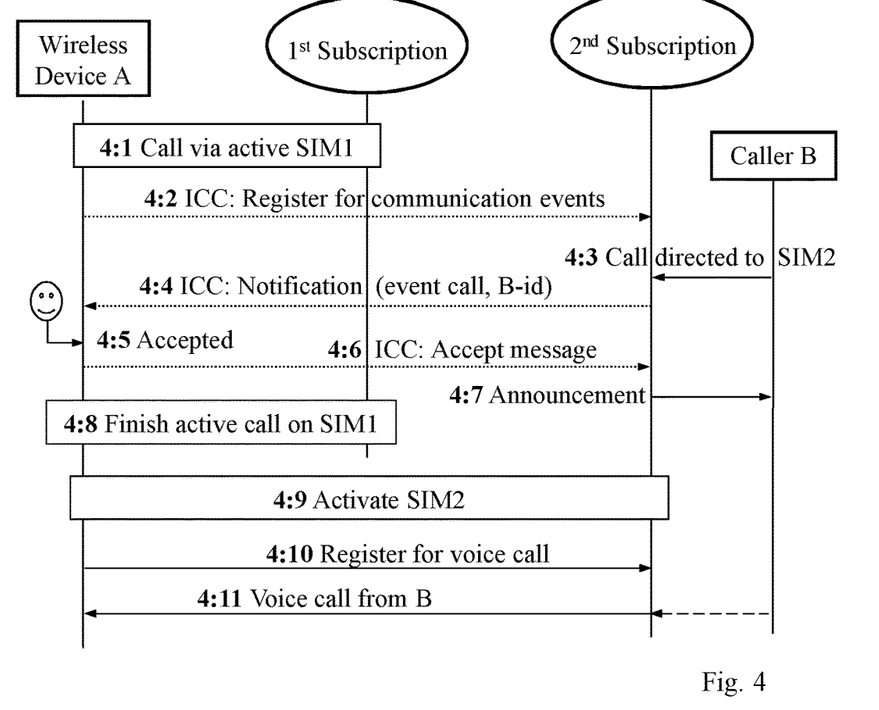
FIG. 4 is a signaling diagram illustrating an example of a procedure when the solution is used for accepting an incoming call, according to further example embodiments.

An example of a procedure when the solution is used for handling an incoming call when accepted, will now be described with reference to the signaling diagram in FIG. 4. In this example, caller B makes a voice call to the wireless device A via the inactive $2^{nd}$ subscription.

In a first action 4:1, the wireless device A establishes a call with another party, not shown, via the first SIM/subscription which thus becomes the active SIM/subscription. In a next action 4:2, the wireless device A establishes an internet connection with the $2^{nd}$ subscription, the connection comprising an ICC, and sends a request or the like to register, i.e. subscribe, for communication events on the inactive $2^{nd}$ subscription including any incoming calls and messages directed to device A.

At some point during the call established in action 4:1, caller B makes a voice call directed to SIM2 in device A, which call is first received by the inactive $2^{nd}$ subscription in a further action 4:3. The wireless device A then receives a notification from the $2^{nd}$ subscription over the ICC in an action 4:4, indicating that a voice call from caller B is waiting on the $2^{nd}$ subscription. This notification comprises information such as event type: voice call, and an identification of B: B-id. The notification is presented on the device A in a suitable manner.

Another action 4:5 illustrates that the user of device A accepts the incoming voice call from B, and the device A accordingly sends an accept message to the $2^{nd}$ subscription over the ICC in response to the notification, in a further action 4:6. A next action 4:7 illustrates that the $2^{nd}$ subscription plays out an announcement to the caller B basically indicating that the call has been accepted and will soon be connected, probably after some expected delay. Meanwhile, the currently active call over the first SIM/subscription is finished in an action 4:8, and the second SIM/subscription is activated between SIM2 and $2^{nd}$ subscription in another action 4:9.

In a further action 4:10, the wireless device A registers to the $2^{nd}$ subscription for receiving the voice call from caller B. A final action 4:11 illustrates that the wireless device A receives the voice call from caller B via the second SIM/subscription. As also mentioned above for FIG. 3, the wireless device A may now establish an internet connection with the first subscription instead, so as to be notified of any incoming communication on the inactive first subscription.

Figure 5:
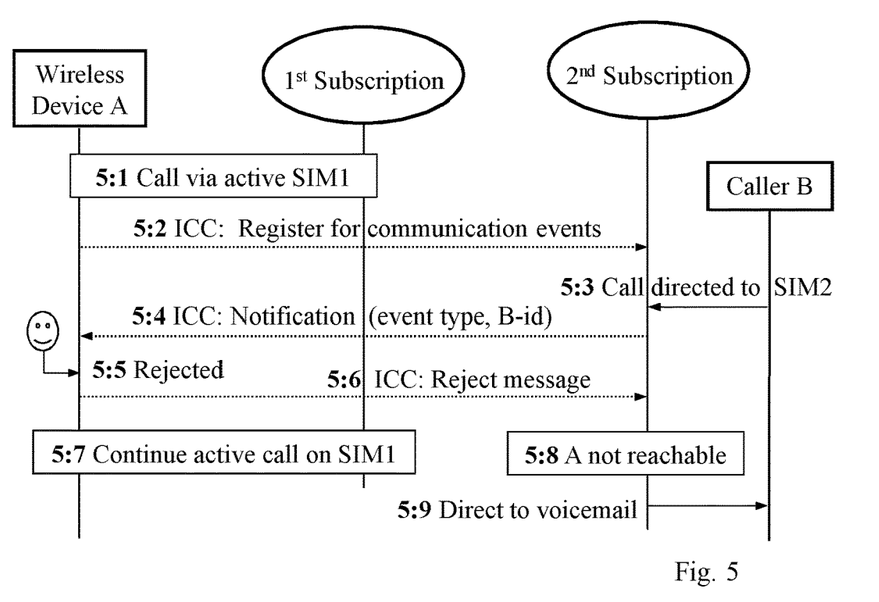
FIG. 5 is a signaling diagram illustrating an example of a procedure when the solution is used for rejecting an incoming call, according to further example embodiments.

An example of a procedure when the solution is used for handling an incoming voice call when rejected, will now be described with reference to the signaling diagram in FIG. 5. In this procedure, the first set of actions 5:1-5:4 is just a repetition of the first set of actions 4:1-4:4 in FIG. 4, thus resulting in the notification in action 5:4 indicating that a voice call from caller B is waiting on the $2^{nd}$ subscription. The following actions are however different from FIG. 4 since the call is in this case not accepted by the user of device A.

The next action 5:5 illustrates that the user of device A thus rejects the incoming voice call from B, and the device A accordingly sends a reject message to the $2^{nd}$ subscription over the ICC in response to the notification, in a further action 5:6. A next action 5:7 illustrates that the active call continues using SIM1 and the 1st subscription. Another action 5:8 indicates that the $2^{nd}$ subscription finds that wireless device A is not reachable. As a result, the $2^{nd}$ subscription directs the call from caller B to a voice mail function according to regular procedures.

Figure 6:
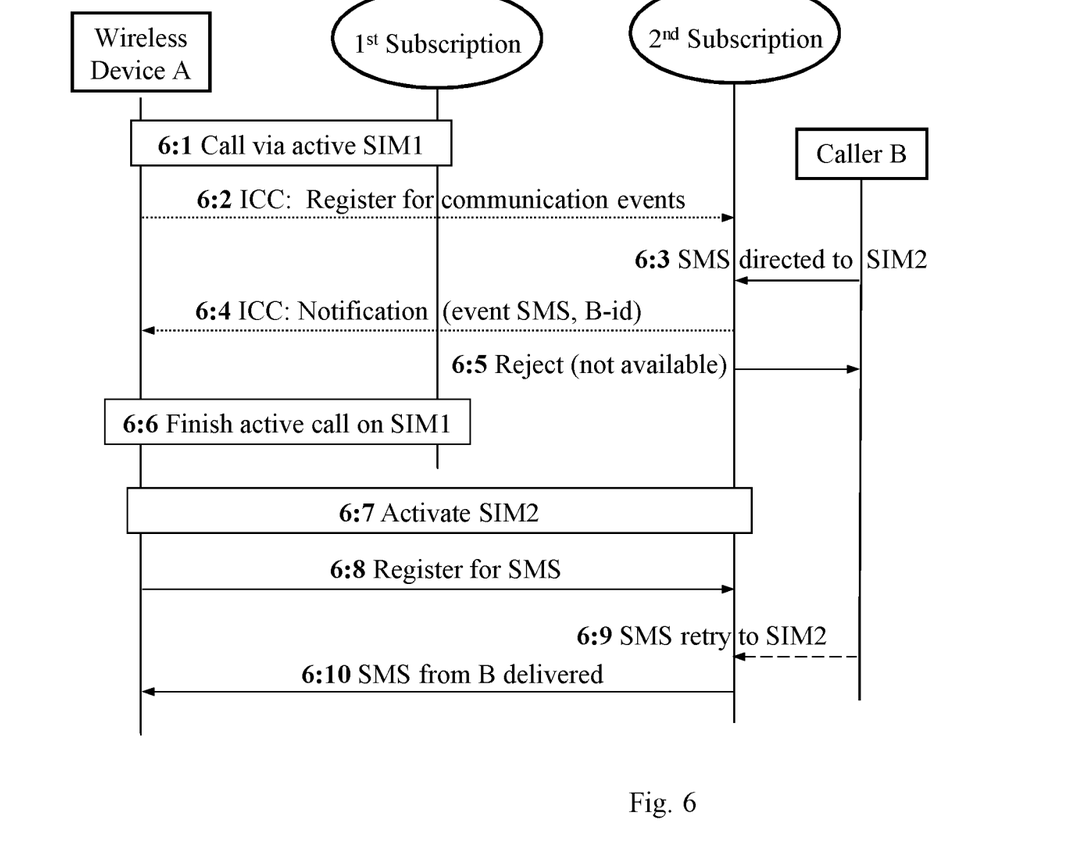
FIG. 6 is a signaling diagram illustrating an example of a procedure when the solution is used for accepting an incoming SMS, according to further example embodiments.

An example of a procedure when the solution is used for accepting an incoming SMS, will now be described with reference to the signaling diagram in FIG. 6. As similar to the foregoing examples in FIGS. 4 and 5, device A establishes a call via the first SIM/subscription in a first action 6:1, and also establishes an internet connection with the $2^{nd}$ subscription and sends a request to register for communication events on the inactive $2^{nd}$ subscription, in another action 6:2.

In this example, caller B sends an SMS directed to SIM2 in device A, which SMS is first received by the inactive $2^{nd}$ subscription in a further action 6:3. The wireless device A then receives a notification from the $2^{nd}$ subscription over the ICC in an action 6:4, indicating that an SMS from caller B is waiting on the $2^{nd}$ subscription. This notification comprises information such as event type: SMS, and an identification of B: B-id. The notification is presented on the device A in a suitable manner.

Another action 6:5 illustrates that the $2^{nd}$ subscription sends or otherwise initiates a suitable reject message to caller B, since the second SIM/subscription is currently inactive. The currently active call over the first SIM/subscription is at some point later finished in an action 6:6, and the second SIM/subscription is activated between SIM2 and $2^{nd}$ subscription in another action 6:7.

In a further action 6:8, the wireless device A registers to the $2^{nd}$ subscription for receiving any SMS via the $2^{nd}$ subscription. Caller B then tries to send the SMS once again to the device A, by sending an "SMS retry to SIM2" to the $2^{nd}$ subscription in an action 6:9. According to conventional procedures for SMS, the message "SMS retry to xx" is automatically sent a preset time after receiving a reject message indicating that a foregoing attempt to send the SMS has failed. A final action 6:10 illustrates that the SMS from B is delivered to device A via the second SIM/subscription.

Figure 7:
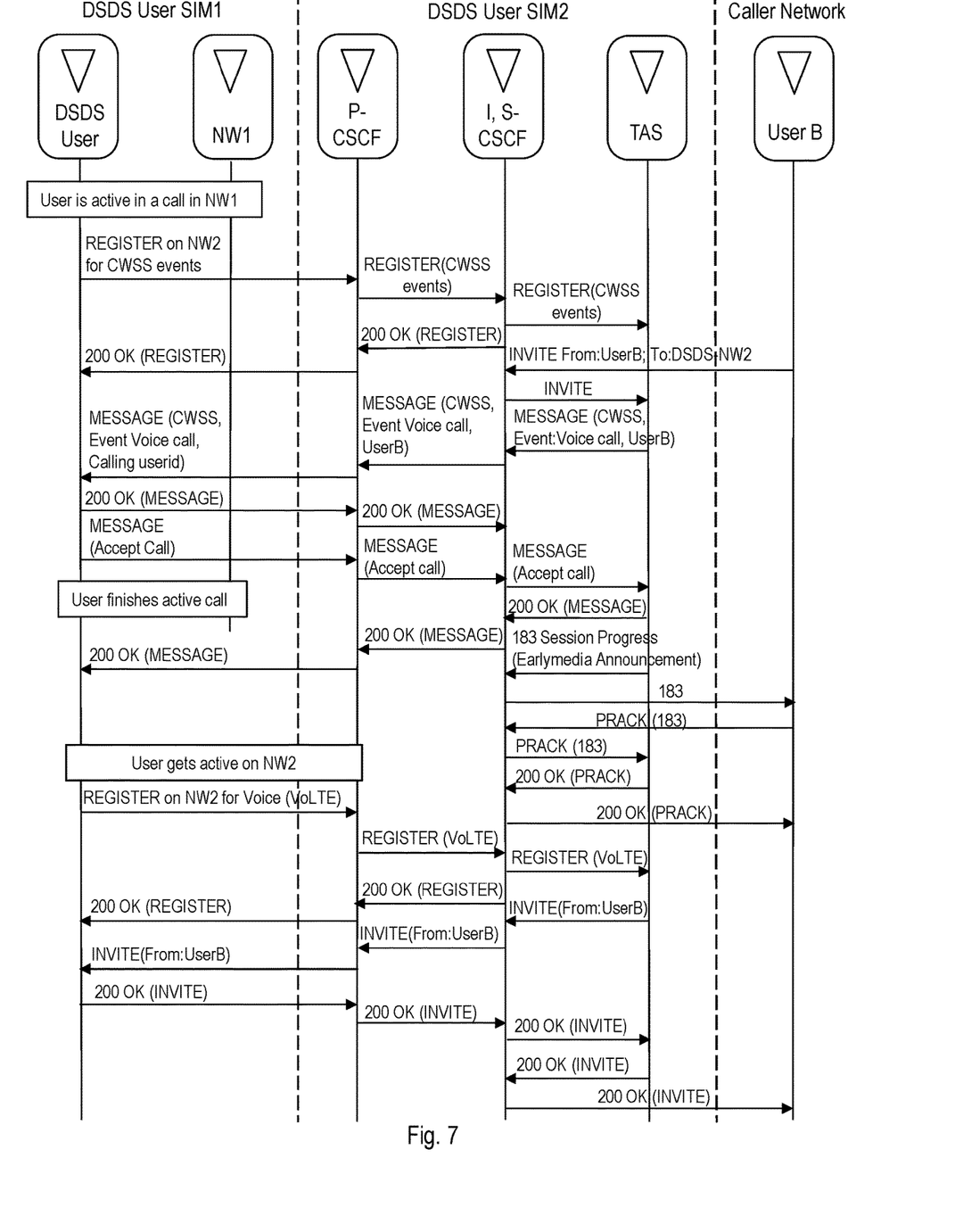
FIG. 7 is a signaling diagram illustrating a more detailed example of how the solution can be used in practice for accepting an incoming voice call, according to further example embodiments.

A more detailed example of how the solution can be used in practice for accepting an incoming voice call, is illustrated in the signaling diagram in FIG. 7. This figure particularly illustrates in more detail which specific messages of the protocol SIP can be used to implement the procedure in FIG. 4.

In FIG. 7, the wireless device A is denoted "DSDS User", the first subscription is handled by a first network denoted "NW1", the second subscription is handled by SIP-enabled nodes in a second network including a so-called Proxy-Call Session Control Function denoted "P-CSCF", a Serving CSCF denoted "I, S-CSCF" and a Telephony Application Server denoted "TAS". These nodes are well-known in the field of the IP Multimedia Subsystem IMS where SIP is commonly used. It is also indicated that the DSDS User uses SIM1 for communication in the first network and SIM2 for communication in the second network. The actions from FIG. 4 can easily be identified in FIG. 7 which is not necessary to describe any further to comprehend this implementation example.

Figure 8:
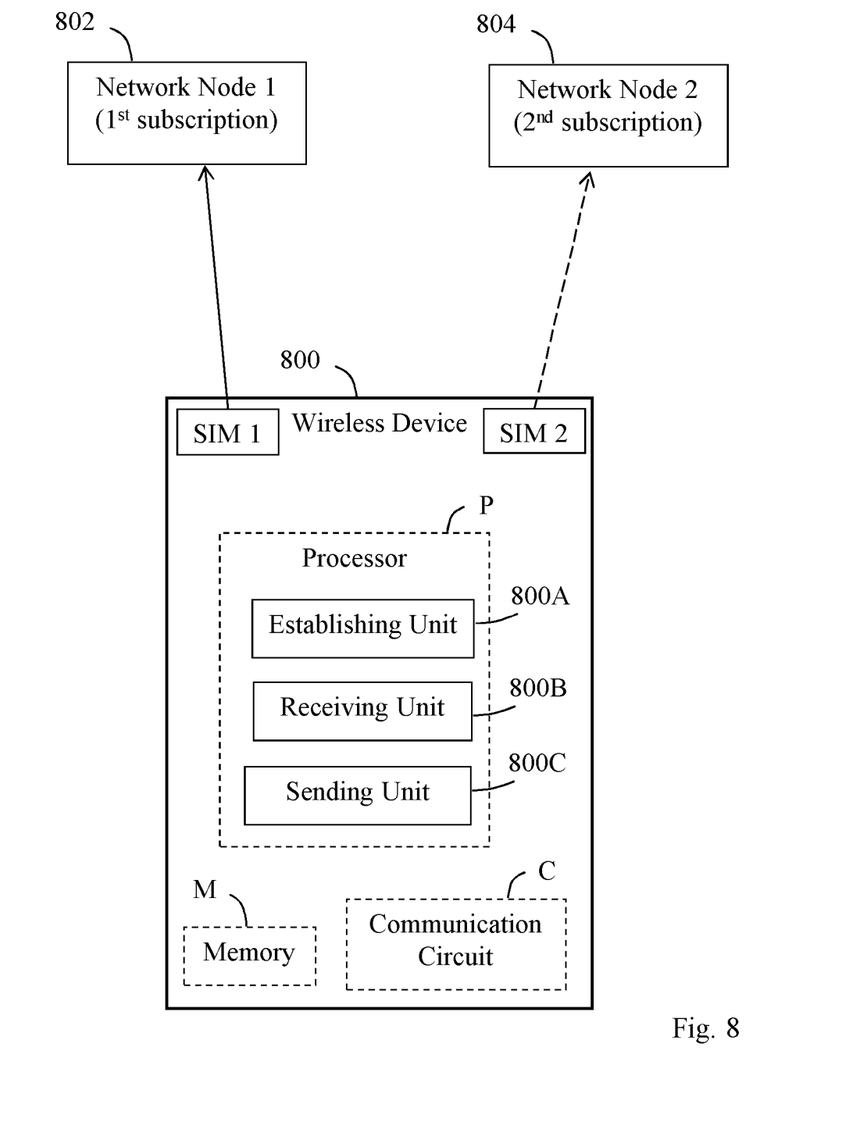
FIG. 8 is a block diagram illustrating how a wireless device may be structured, according to further example embodiments.

The block diagram in FIG. 8 illustrates a detailed but non-limiting example of how a wireless device 800 may be structured to bring about the above-described solution and embodiments thereof. In this figure, the wireless device 800 may be configured to operate according to any of the examples and embodiments of employing the solution as described herein, where appropriate. The wireless device 800 is shown to comprise a processor "P", a memory "M" and a communication circuit "C" with suitable equipment for transmitting and receiving information and messages in the manner described herein.

The communication circuit C in the wireless device 800 thus comprises equipment configured for communication using a suitable protocol for the communication depending on the implementation. The solution is however not limited to any specific types of messages or protocols.

The wireless device 800 is, e.g. by means of units, modules or the like, configured or arranged to perform at least some of the actions of the flow chart in FIG. 3 as follows. The wireless device 800 has a first SIM, denoted SIM1, associated with a first subscription and a second SIM, denoted SIM2, associated with a second subscription.

The wireless device 800 is arranged to handle communications using the first and second SIMs. The wireless device 800 is configured to establish an internet connection, such as 206A or 206B in FIG. 2, with the second subscription when the first SIM and the first subscription are active in an ongoing communication. This operation may be performed by an establishing unit 800A in the wireless device 800, as also illustrated in action 300. The establishing unit 800A could alternatively be named a connection unit or internet unit.

The wireless device 800 is further configured to receive a notification over said internet connection indicating that an incoming communication directed to the second SIM has been received by the second subscription. This operation may be performed by a receiving unit 800B in the wireless device 800, as illustrated in action 306. The receiving unit 800B could alternatively be named an obtaining unit.

The wireless device 800 may further be configured to send a response message to the second subscription over said internet connection, the response message indicating whether the incoming communication is accepted or rejected. This operation may be performed by a sending unit 800C in the wireless device 800, as illustrated in action 306. The sending unit 800C could alternatively be named a responding unit or messaging unit.

It should be noted that FIG. 8 illustrates various functional units in the wireless device 800 and the skilled person is able to implement these functional units in practice using suitable software and hardware equipment. Thus, the solution is generally not limited to the shown structure of the wireless device 800, and the functional units therein may be configured to operate according to any of the features, examples and embodiments described in this disclosure, where appropriate.

The functional units 800A-C described above may be implemented in the wireless device 800 by means of program modules of a computer program comprising code means which, when run by the processor P causes the wireless device 800 to perform the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

The computer program may be carried by a computer program product in the wireless device 800 in the form of a memory having a computer readable medium and being connected to the processor P. The computer program product or memory M in the wireless device 800 thus comprises a computer readable medium on which the computer program is stored e.g. in the form of computer program modules or the like. For example, the memory M may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the wireless device 800.

The solution and embodiments described herein may be implemented in the wireless device 800 by a computer program comprising instructions which, when executed on at least one processor, cause the at least one processor to carry out the actions according to any of the above embodiments and examples, where appropriate. The solution and embodiments may also be implemented at the wireless device 800 in a carrier containing the above computer program, wherein the carrier is one of an electronic signal, optical signal, radio signal, or computer readable storage medium.

While the solution has been described with reference to specific exemplifying embodiments, the description is generally only intended to illustrate the inventive concept and should not be taken as limiting the scope of the solution. For example, the terms "wireless device", "subscription", "internet connection", "notification" and "response message" have been used throughout this disclosure, although any other corresponding entities, functions, and/or parameters could also be used having the features and characteristics described here. The solution may be defined by the appended claims.

The invention claimed is:

1. A method performed by a wireless device having a first Subscriber Identity Module (SIM) associated with a first subscription and a second SIM associated with a second subscription, for handling communications using the first SIM and the second SIM, the method comprising:

establishing an access connection for the wireless device to the first subscription by use of the first SIM, wherein the second SIM is inactive while the first SIM is active;

establishing an internet connection between the wireless device and the second subscription by use of the first SIM, while the first SIM is active in an ongoing communication; and receiving, by the wireless device via use of the first SIM which is active, a notification over the internet connection from the second subscription indicating that an incoming communication directed to the second SIM has been received by the second subscription.

2. The method according to claim 1, further comprising sending a response message to the second subscription over the internet connection, the response message indicating whether the incoming communication is accepted or rejected.

3. The method according to claim 2, wherein when the response message is an accept message the ongoing communication is terminated via the first SIM and the incoming communication is received via the second SIM.

4. The method according to claim 1, wherein the internet connection is established via the first SIM over the access connection used in the ongoing communication or over a connection not used in the ongoing communication.

5. The method according to claim 1, wherein the wireless device communicates over the internet connection using a Session Initiation Protocol (SIP) or a HTTP/rest protocol.

6. The method according to claim 5, wherein the establishing the internet connection includes sending a SIP REGISTER message to the second subscription.

7. The method according to claim 6, wherein the SIP REGISTER message subscribes for communication events directed to the second SIM via the second subscription.

8. The method according to claim 1, wherein the internet connection comprises an Internet Control Channel (ICC).

9. The method according to claim 1, wherein the notification comprises a Call Waiting in Standby Subscription (CWSS) message.

10. The method according to claim 1, wherein the establishing the internet connection is triggered when the ongoing communication is established.

11. A wireless device having a first Subscriber Identity Module (SIM) associated with a first subscription and a second SIM associated with a second subscription, to handle communications using the first SIM and the second SIM, wherein the wireless device is to:
   establish an access connection for the wireless device to the first subscription by use of the first SIM, wherein the second SIM is inactive while the first SIM is active;
   establish an internet connection between the wireless device and the second subscription by use of the first SIM, while the first SIM is active in an ongoing communication; and
   receive, by the wireless device via use of the SIM which is active, a notification over the internet connection from the second subscription indicating that an incoming communication directed to the second SIM has been received by the second subscription.

12. The wireless device according to claim 11, wherein the wireless device is further to send a response message to the second subscription over the internet connection, the response message indicating whether the incoming communication is accepted or rejected.

13. The wireless device according to claim 12, wherein when the response message is an accept message, the wireless device to terminate the ongoing communication via the first SIM and receive the incoming communication via the second SIM.

14. The wireless device according to claim 11, wherein the wireless device to establish the internet connection via the first SIM over the access connection used in the ongoing communication or over a connection not used in the ongoing communication.

15. The wireless device according to claim 11, wherein the wireless device to communicate over the internet connection using a Session Initiation Protocol (SIP) or a HTTP/rest protocol.

16. The wireless device according to claim 15, wherein the wireless device to establish the internet connection by sending a SIP REGISTER message to the second subscription.

17. The wireless device according to claim 16, wherein the SIP REGISTER message subscribes for communication events directed to the second SIM via the second subscription.

18. The wireless device according to claim 11, wherein the internet connection comprises an Internet Control Channel (ICC).

19. The wireless device according to claim 11, wherein the notification comprises a Call Waiting in Standby Subscription (CWSS) message.

20. The wireless device according to claim 11, wherein the wireless device to establish the internet connection is triggered when the ongoing communication is established.

21. A non-transitory computer-readable storage medium comprising instructions which, when executed on at least one processor, cause a wireless device, having a first Subscriber Identity Module (SIM) associated with a first subscription and a second SIM associated with a second subscription, to handle communications using the first SIM and the second SIM by performing operations comprising:
   establishing an access connection for the wireless device to the first subscription by use of the first SIM, wherein the second SIM is inactive while the first SIM is active;
   establishing an internet connection between the wireless device and the second subscription by use of the first SIM, while the first SIM is active in an ongoing communication; and
   receiving, by the wireless device via use of the first SIM which is active, a notification over the internet connection from the second subscription indicating that an incoming communication directed to the second SIM has been received by the second subscription.

22. The non-transitory computer-readable storage medium according to claim 21, wherein the operations further comprising sending a response message to the second subscription over the internet connection, the response message indicating whether the incoming communication is accepted or rejected.

23. The non-transitory computer-readable storage medium according to claim 22, wherein when the response message is an accept message the ongoing communication is terminated via the first SIM and the incoming communication is received via the second SIM.

24. The non-transitory computer-readable storage medium according to claim 21, wherein the operations for establishing the internet connection includes using a Session Initiation Protocol (SIP) and sending a SIP REGISTER message to the second subscription.

25. The non-transitory computer-readable storage medium according to claim 24, wherein the SIP REGISTER message subscribes for communication events directed to the second SIM via the second subscription.

26. The non-transitory computer-readable storage medium according to claim 21, wherein the notification comprises a Call Waiting in Standby Subscription (CWSS) message.

* * * * *